(12) United States Patent
Lee et al.

(10) Patent No.: US 7,515,831 B2
(45) Date of Patent: Apr. 7, 2009

(54) SYSTEM AND METHOD FOR AUTO-CONFIGURING A TELECOMMUNICATION DEVICE WITH AN EMBEDDED CONTROLLER

(75) Inventors: Patrick S. Lee, Milpitas, CA (US); Xiaoguang Yu, Wuhan (CN)

(73) Assignee: O2Micro International Ltd., Georgetown (KY)

( * ) Notice: Subject to any disclaimer, the term of this patent is extended or adjusted under 35 U.S.C. 154(b) by 512 days.

(21) Appl. No.: 11/068,467

(22) Filed: Feb. 25, 2005

(65) Prior Publication Data

US 2006/0239692 A1 Oct. 26, 2006

(51) Int. Cl.
*H04B 10/00* (2006.01)
*G11C 7/10* (2006.01)

(52) U.S. Cl. .................. 398/135; 398/138; 398/158; 714/751; 714/764; 714/768; 365/230.01; 365/238.5

(58) Field of Classification Search ............... 398/135, 398/202, 137, 138, 140, 139, 141, 158, 25, 398/33; 714/746, 764, 768, 751; 711/1, 711/2, 3, 5, 101, 103, 147, 154, 170, 173, 711/202, 212, 217, 218, 220; 365/78, 120, 365/189.011, 189.03, 189.04, 189.2, 230.01, 365/230.03, 238.5

See application file for complete search history.

(56) References Cited

U.S. PATENT DOCUMENTS

| | | | |
|---|---|---|---|
| 6,665,497 B1 * | 12/2003 | Hamilton-Gahart et al. | 398/135 |
| 7,127,177 B1 * | 10/2006 | Weber et al. | 398/137 |
| 2004/0008996 A1 * | 1/2004 | Aronson et al. | 398/202 |
| 2004/0022544 A1 * | 2/2004 | Case et al. | 398/137 |

* cited by examiner

*Primary Examiner*—M. R. Sedighian
(74) *Attorney, Agent, or Firm*—Wang Law Firm; Li K. Wang (57) ABSTRACT

The present invention is a telecommunication device with an auto-configurable capability that supports both serial and parallel data interfaces. The telecommunication device can transfer configuration data through a serial interface such as I2C interface and a parallel interface such as UPI. The telecommunication device can auto-configure through the I2C interface in master mode. The selectable configuration data stored in a second memory device is fetched by the telecommunication device through the I2C interface.

23 Claims, 9 Drawing Sheets

SYSTEM AND METHOD FOR AUTO-CONFIGURING A TELECOMMUNICATION DEVICE WITH AN EMBEDDED CONTROLLER

FIELD OF THE INVENTION

The present invention relates to a telecommunication chip, and in particular, to an auto-configurable telecommunication chip with a serial interface.

BACKGROUND OF THE INVENTION

Transponders are commonly used in optical signal transmission. An optical signal carrying data arriving from one optical fiber is converted by a transponder to an electrical signal and then sent across a conductive media to its destination where the data are used. The electrical signal with data may also be converted by the transponder to an optical signal and sent through the optical fiber to another destination. During the transmission of the data over the optical fiber or during the conversion of the data to electrical signals, errors may occur and these errors adversely affect the data.

The errors may be corrected through an error correction circuit. The optical signal or electrical signal may be processed by an external error correction unit before these signals are sent to other circuits for use. However, an external error correction unit adds to the complexity of overall design of a transponder-based retransmission unit.

An alternative approach is to incorporate the error correction unit into the transponder unit. This approach makes the resulting transponder unit more compact and eliminates the need for the external error correcting unit. However, this approach increases the number of data connectors that often exceeds the number of connectors allowed.

The error correction unit is usually implemented as an application specific integrated circuit (ASIC) that can be configured differently to conform to different operating conditions. Besides receiving signal data, the error correction unit also receives configuration data from an external source. Thus, the error correction unit requires a larger number of connectors for handling both the signal data and configuration data.

When the error correction unit is incorporated into the transponder, the number of connectors exceeds the limit that is imposed on the transponder and makes the combination circuit difficult, if not impossible, to fit within a traditional foot print for the transponder. It is thus desirous to have an apparatus and method that incorporates an error correction unit in a transponder without exceeding the connector limit for the transponder, and it is to such apparatus and method the present invention is primarily directed.

BRIEF SUMMARY OF THE INVENTION

An auto-configurable telecommunication device according to the invention has error correction capabilities for handing optical signals and electronic signals. The telecommunication device includes an optical-to-electronic transition unit for converting incoming optical signals received from a first external source into incoming electronic signals, an electronic-to-optical transition unit for converting outgoing electronic signals received from an auto-configurable error correction unit into outgoing optical signals, the auto-configurable error correction unit being capable of correcting errors in the incoming electronic signals and outgoing electronic signals according to a predefined algorithm, and a serial interface unit being capable of receiving configuration data from a second external source and storing the configuration data into a storage unit.

In another embodiment, the invention is an auto-configurable telecommunication device for processing a predefined function in a communication network. The telecommunication device includes a functional unit for processing the predefined telecommunication function, a master controller capable of retrieving configuration data from an external memory device, at least one register for storing the configuration data, a slave controller capable of transmitting the configuration data from an external controller to at least one register and retrieving the configuration data from the at least one on-chip register upon a request from the external controller, and a universal processor interface unit for providing an interface to the external controller. The configuration data is used to auto-configure the telecommunication device upon power up.

In yet another embodiment, the invention is a method for auto-configuring a target device. The method includes receiving a plurality of signals from an external unit, determining an operating mode for the target device through the plurality of signals, retrieving configuration data from an external source through a serial interface if the operating mode is a master mode, receiving the configuration data from an external processor through the serial interface if the operating mode is a slave mode, and storing the configuration data into on-chip registers, wherein the configuration data will be used to auto-configure the target device.

In yet another embodiment, the invention is a method for retrieving a target datum from a first memory device and determining a target address for its storage in a second memory device. This method includes retrieving the datum from the first memory device, retrieving a current address set for the target datum from the first memory device, determining a format for the current address set, if the current address set has a first format, which include a page address and an offset address, computing the target address for the target datum by adding the page address to the offset address of the current address set, and if the current address set has a second format, which includes an offset address, computing the target address for the target datum by adding the page address from a previous address set to the offset address from the current address set.

Other objects, features, and advantages of the present invention will become apparent from review of the Brief Description of the Drawings, Detailed Description of the Invention, and the Claims set forth hereinafter.

BRIEF DESCRIPTION OF THE DRAWINGS

Advantages of the present invention will be apparent from the following detailed description of exemplary embodiments thereof, which description should be considered in conjunction with the accompanying drawings, in which.

DETAILED DESCRIPTION OF THE INVENTION

Figure 1:
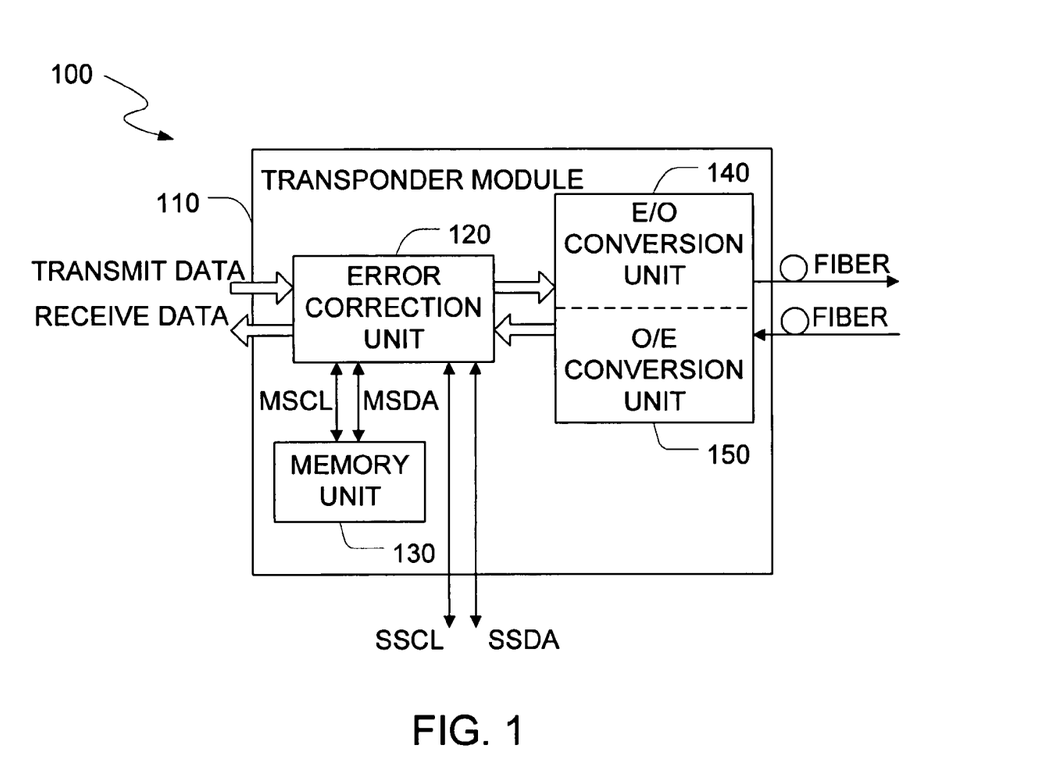
FIG. 1 is a block diagram of an exemplary auto-configurable telecommunication device consistent with the invention having auto-configuration and error correction capabilities.

The invention provides a serial interface to a telecommunication device, which traditionally uses a UPI interface for configuration, so that an error correction unit can be incorporated into the telecommunication device without exceeding the connector limit for the telecommunication device. FIG. 1 illustrates a block diagram 100 of an exemplary auto-configurable telecommunication device. In this embodiment, the telecommunication device is a transponder module 110 with auto-configuration and error correction capabilities. The transponder module 110 may receive data in form of optical signals from optical fibers, convert the optical signals into electrical signals, and transmit the electrical signals to an electrical circuit. The transponder module 110 may also receive electrical signals from the electrical circuit, convert them to optical signals, and transmit the optical signals onto the optical fibers. The transponder module 110 includes an error correction unit 120, a memory unit 130, an electrical signal to optical signal conversion (E/O) unit 140, and an optical signal to electrical signal conversion (O/E) unit 150.

The O/E unit 150 receives optical signals from optical fibers and converts the optical signals into electrical signals. These electrical signals may contain errors from the transmission and conversion, and need to be corrected before they are transmitted to other electrical circuits. The correction is done by the error correction unit 120. The E/O unit 140 receives electrical signals from the error correction unit 120 and converts them into optical signals before transmitting them on the optical fibers.

According to a predefined algorithm, the error correction unit 120 also corrects any error that may be embedded in the electrical signals received from other electrical circuits before converting these electrical signals into optical signals and transmitting them onto the optical fibers. The algorithm may implement an International Telecommunication Union (ITU) standard, ITU G.709, which utilizes forward error correction (FEC) mechanism. The error correction unit 120 can automatically access the configuration data stored in the memory unit 130 through a serial interface. In one embodiment, the serial interface between the error correction unit 120 and the memory unit 130 is an Inter-integrated circuit (I2C) interface. The error correction unit 120 retrieves the configuration data from the memory unit 130 and stores them in its internal registers for use during the auto-configuration procedure. The error correction unit 120 can also be configured by an external processing unit (not shown in FIG. 1). In this case, the error correction unit 120 acts as a slave to the external processing unit and the external processing unit provides configuration data to the error correction unit 120.

The memory unit 130 may be an electrically erasable programmable read only memory (EEPROM), a Flash memory (Flash ROM), an electrically programmable read only memory (EPROM), or other suitable memory devices. The configuration data are stored in the memory unit 130.

When the error correction unit 120 is powered on, it reads data from the memory unit 130 through a serial and bi-directional data connector, MSDA, under control of a clock control signal, MSCL. After finishing reading data from the memory unit 130, the error correction unit 120 stores the configuration data into its internal on-chip registers and then automatically configure itself according to the configuration data. Alternatively, the error correction unit 120 can be programmed with data from another external component through another serial and bi-directional data connector SSDA and another clock control signal SSCL.

Figure 2:
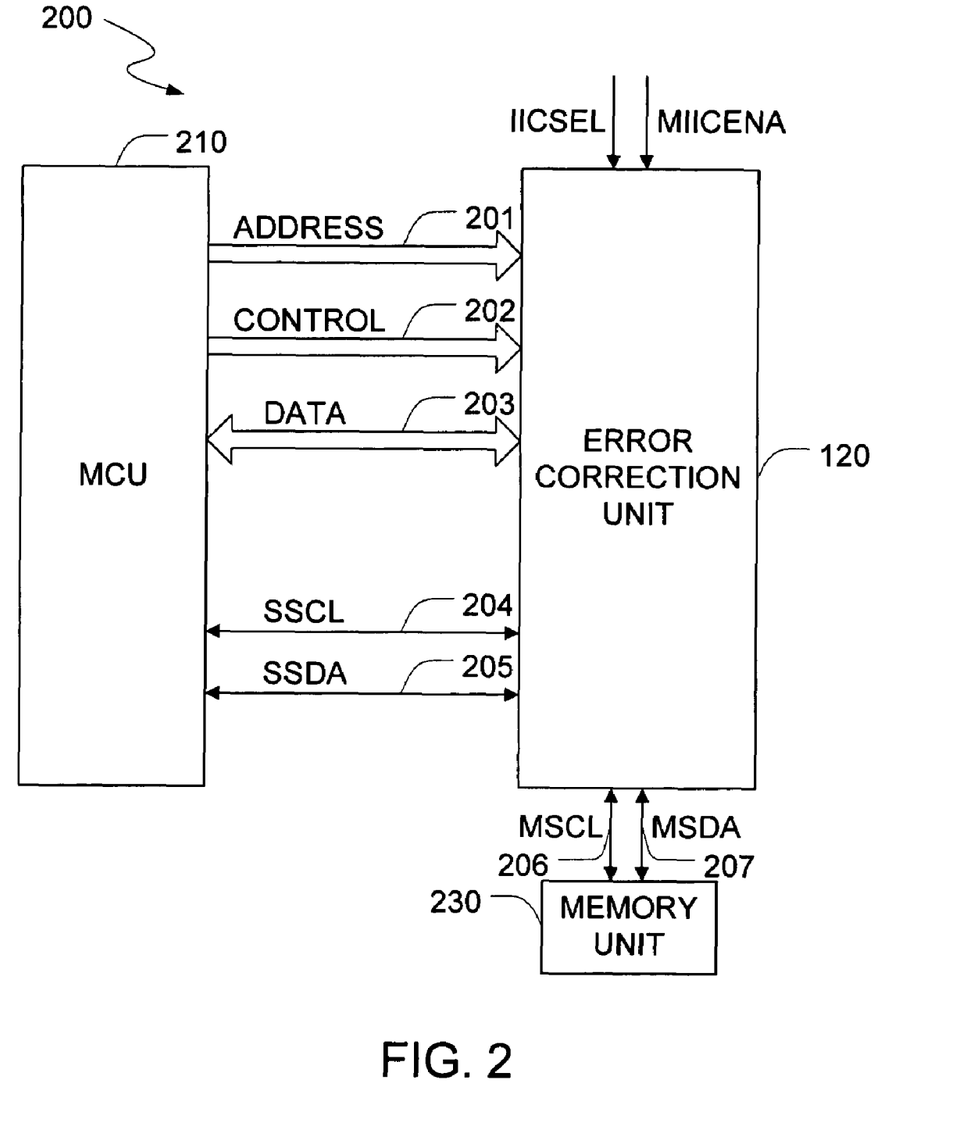
FIG. 2 is an interface block diagram of an exemplary auto-configurable telecommunication device consistent with the invention.

Turning to FIG. 2, an interface block diagram 200 between a micro controller unit (MCU) 210 and an error correction unit 120 is illustrated. In this embodiment, the error correction unit 120 can be auto-configured according to user requirements and correct errors in signals received from external components. The error correction unit 120 is in communication with a memory unit 230. The error correction unit 120 is also coupled to the external component such as the MCU 210. In one embodiment, the error correction unit 120 is provided with three interfaces that include a universal processor interface (UPI), one master serial interface, and one slave serial interface. The UPI, as shown in FIG. 2, includes an address bus 201, a control bus 202, and a data bus 203. The slave serial interface includes a slave clock connector (SSCL) 204 and a slave data connector (SSDA) 205. The slave serial interface is used in a slave mode. The master serial interface includes a master clock connector (MSCL) 206 and a master data connector (MSDA) 207. The master serial interface is used in a master mode, and these master connectors connect the error correction unit 120 to the memory unit 230. The data bus 203, the SSDA 205, and the MSDA 207 are all bi-directional. In one embodiment, the master and slave serial interfaces are Inter-integrated circuit (I2C) interfaces.

Although the embodiment shown in FIG. 2 includes three different types of interfaces, UPI, master serial interface, and slave serial interface, it is understood by those skilled in the art that an embodiment with any one of the interfaces would provide the functionality needed to configure the error correction unit 120.

The UPI is a parallel interface between the MCU 210 and the error correction unit 120 and may be used to transmit data between them. It should be recognized by those skilled in the art that the MCU 210 may be any kind of processors, microprocessors or other general purpose processors. When the error correction unit 120 is powered on, it can receive data from the MCU 210 or transmit data to the MCU 210 through the UPI. The UPI utilizes a plurality of buses to transmit information between the MCU 210 and the error correction unit 120. The data bus 203 transmits data between the MCU 210 and the error correction unit 120. The control bus 202 includes all the control signals between the MCU 210 and the error correction unit 120. The address bus 201 selects a particular address space of internal on-chip registers in the error correction unit 120 where the MCU 210 wants to control or to store the data. For example, the MCU 210 can use control signals on the control bus 202 to direct the error correction 120 to receive data from the MCU 210 or transmit data from the error correction unit 120 to the MCU 210. Upon a request from the MCU 210, the data then can be transmitted between the MCU 210 and the error correction unit 120 and the destination of data are determined by the address bus 203. The error correction unit 120 can store the received data into its on-chip registers. The data in the on-chip registers can be used to configure the error correction unit 120.

The slave clock connector SSCL 204 and the slave data connector SSDA 205 are used by the slave serial interface. The slave serial interface is used when the error correction unit 120 is operating in the slave mode. The slave serial interface may optionally share the pins or connectors with the UPI. The slave serial interface is connected to an external component, such as the MCU 210. The MCU 210 can also control the data transmission between the MCU 210 and the error correction unit 120 through the slave serial interface. The error correction unit 120 can enter the slave mode and receive data from the external component, such as the MCU 210. During the slave mode, the error correction unit 120 is responsive to the MCU 210 through the use of the slave clock connector (such as the SSCL 204). When the error correction unit 120 powers on, it receives data from the MCU 210 through the data connector SSDA 205. When all configuration data have been received and stored into the on-chip registers embedded in the error correction unit 120, the error correction unit 120 auto-configures according to the data received. After the error correction unit 120 is up and running, it corrects the errors in telecommunication data. In a similar way, the MCU 210 may request and receive information from the error correction unit 120 through the data connector SSDA 205.

The master clock connector MSCL 206 and the master data connector MSDA 207 are used by the master serial interface in the master mode. The master serial interface may be an I2C interface. The master serial interface is used to access the memory unit 230. The memory unit 230 is provided to the error correction unit 120 for storing auto-configuration data. The memory unit 230 may be an electronically erasable programmable read only memory (EEPROM), an electrically programmable read only memory (EPROM), or other suitable memory devices. When the power is firstly supplied to the error correction unit 120, it operates in the master mode and reads configuration data from the memory unit 230 through the master data connector MSDA 207. The configuration data is stored into the error correction unit's internal on-chip registers. After reading data from the memory unit 230, the error correction unit 120 configures itself according to the configuration data. The errors in the telecommunication data resulting from transmission and conversion are corrected by the error correction unit 120 according to a predefined algorithm, such as ITU G.709.

Figure 3:
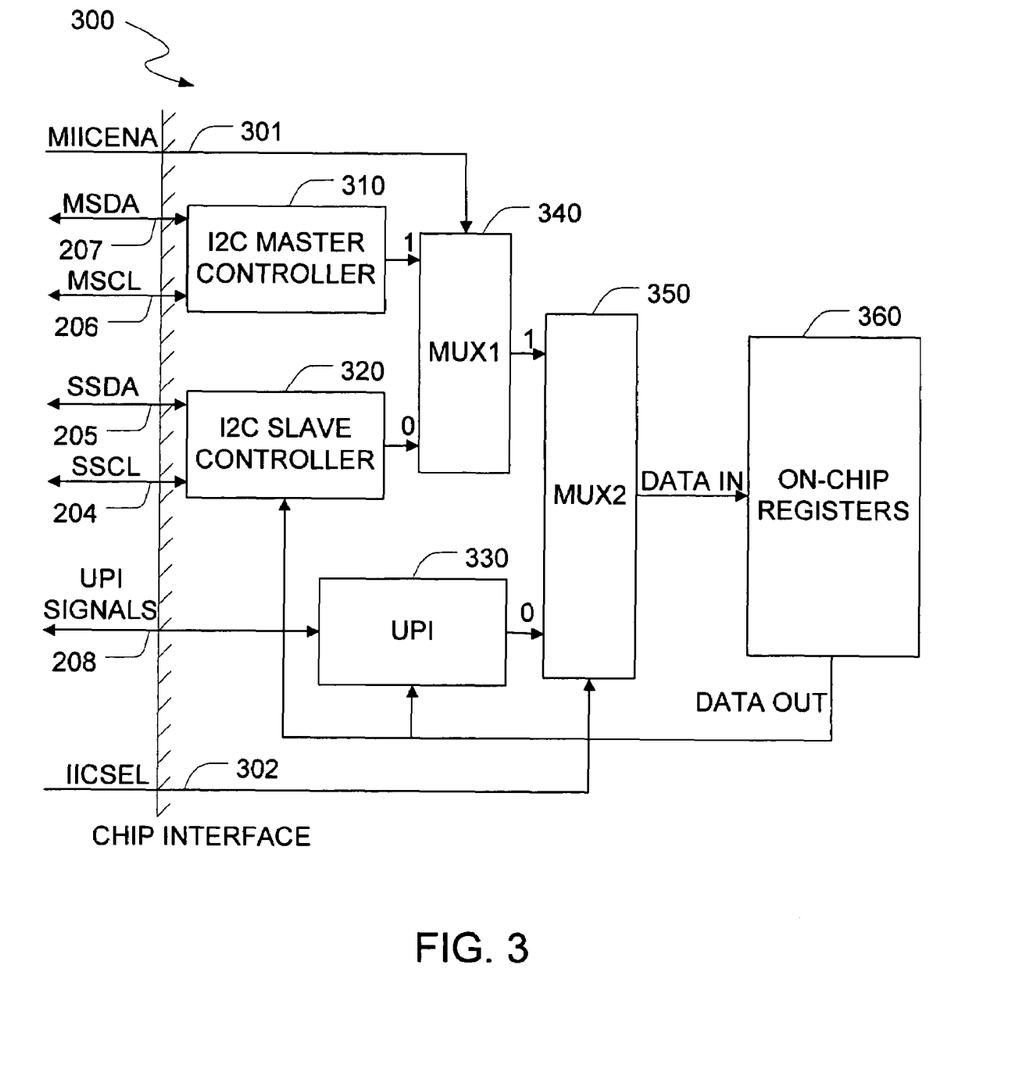
FIG. 3 is a block diagram of the exemplary auto-configurable telecommunication device of FIG. 2 consistent with the invention.

FIG. 3 illustrates a configuration interface block diagram 300 of the error correction unit 120. In this embodiment, the error correction unit 120 may include an I2C master controller 310, an I2C slave controller 320, a UPI 330, a multiplexer (MUX) 1 340, a multiplexer (MUX) 2 350, and on-chip registers 360. The master data connector MSDA 207 and the master clock connector MSCL 206 are used by the I2C master controller 310 in the master mode. The slave data connector SSDA 205 and the slave clock connector SSCL 204 are used by the I2C slave controller 320 in the slave mode. UPI signals 208 shown in FIG. 3 represent data, control signals and other signals from the address bus 201, the control bus 202, and the data bus 203. The MUX 1 340 and the MUX 2 350 are used for selecting which data to be stored into the on-chip registers 360. Signals MIICENA 301 and IICSEL 302 are enabling signals used to select the operation mode of the error correction unit 120.

Signals MIICENA 301 and IICSEL 302 enable the error correction unit 120 to act in the master mode and is coupled to a master serial interface. The I2C master controller 310 can retrieve data from an external source, for example the memory unit 230 (not shown in FIG. 3). The I2C master controller 310 can read the data from the external source through the I2C interface directly after it is powered up. More specifically, the data is read through the data connector of the I2C interface, for example the MSDA 207, under the control of the master clock connector, the MSCL 206. The I2C master controller 310 can store the auto-configured data in the on-chip registers 360 for auto-configuring the error correction unit 120.

The I2C slave controller 320 is used in the slave mode and receives data from an external universal processor, for example the MCU 210 (not shown in FIG. 3) through another I2C interface. The I2C slave controller 320 receives the data from the external universal processor through the slave data connector SSDA 205. After receiving the data, the error correction unit 120 can store the configured data in the on-chip registers 360.

It is appreciated by those skilled in the art that the I2C master controller and the I2C slave controller may be incorporated into one single unit, the master data connector and the slave data connector may be combined, and the master clock connector and the slave clock connector may also be combined. In this embodiment, the data connectors can be bi-directional.

The UPI 330 provides a default parallel mode to the error correction unit 120. The UPI 330 provides a parallel interface to the external universal processor. The data are transferred through the UPI under the control of the external universal processor. In an alternative embodiment, the I2C interface, either the I2C slave controller 320 or the I2C master controller, can share the connector pins with the UPI 330.

Signals MIICENA 301 and IICSEL 302 are used to control the operating mode of the error correction unit 120 and select which interface to use. The signal MIICENA 301 and the signal IICSEL 302 are enabling signals. They are used to determine which interface should be active and used to transmit the data between external components and the on-chip registers 360 of the error correction unit 120.

The data outputs from the I2C master controller 310 and the I2C salve controller 320 are fed to the MUX 1 340. The MUX 1 340 routes one of the data outputs to its output depending on the signal MIICENA 301. The output from the MUX 1 340 and the data output from the UPI 330 are fed to the MUX 2 350. The MUX 2 350 routes one of the data outputs to its output, which is connected to the on-chip registers 360, depending on the signal IICSEL 302. Through the combination of the MUX 1 340 and the MUX 2 350, the data from the master serial interface, the slave serial interface, and the UPI can be stored to the on-chip registers 360.

The data inside the on-chip registers 360 may also be read by an external processor. The data from the on-chip registers 360 can be read either by the I2C slave controller 320 or the UPI 330. Though the I2C interfaces are represented in FIG. 3, those skilled in the art will appreciate other serial interfaces may also be implemented without departing from the spirit of the invention.

Figure 4:
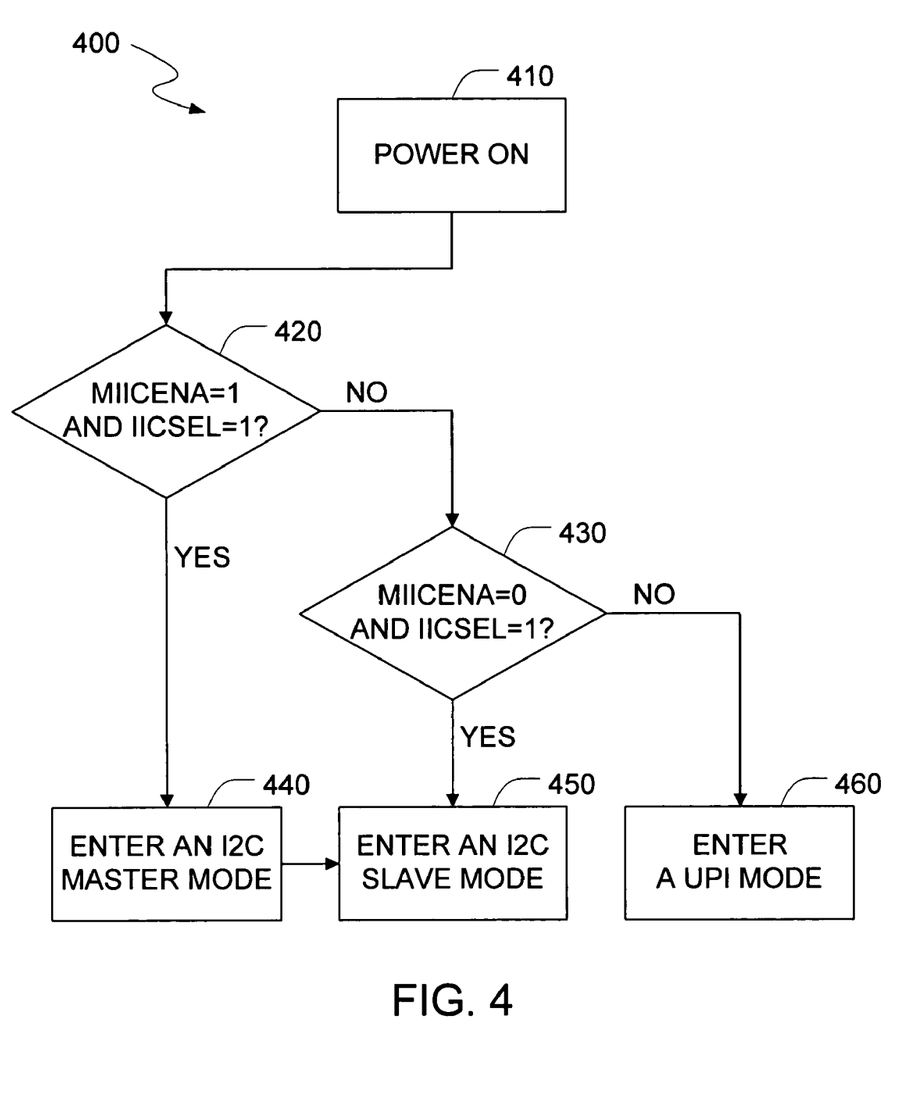
FIG. 4 is a flow chart for determining the operating mode of an error correction unit.

FIG. 4 illustrates a flow chart 400 for determining the operating mode upon powering up. When the error correction unit 120 is powered, step 410, it checks signals MIICENA 301 and IICSEL 302, step 420. If both MIICENA 301 and IICSEL 302 are high (that is the status of these signals can be denoted (1, 1)), the error correction unit 120 enters a master mode, for example an I2C master mode, step 440, which enables the I2C master controller 310 to retrieve data from an external source. After retrieving the data, the error correction unit 120 enters into a slave mode, for example an I2C slave mode, step 450. If MIICSEL 301 is low and IICSEL 302 is high, step 430, the error correction unit 120 enters the slave mode, step 450, in which the error correction unit 120 awaits for commands from the external processor. In the I2C slave mode, data may be transmitted between the external processor and the I2C slave controller 320 through the data connector SSDA 205. If IICSEL 302 is not high, then the error correction enters a UPI mode, step 460. In the UPI mode, the external processor can read data from the error correction unit 120, and/or transmit data into the error correction unit 120 through the UPI 330.

Figure 5:
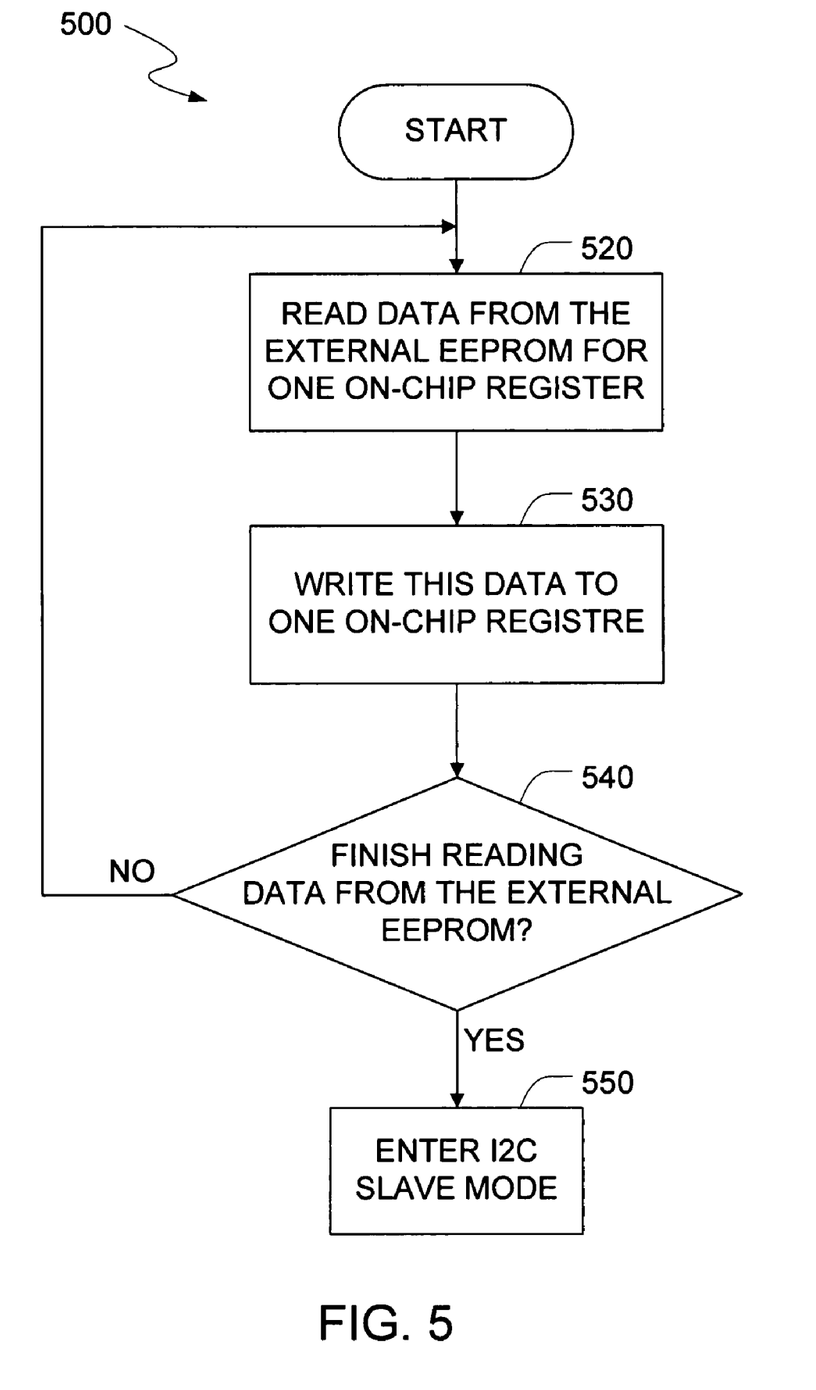
FIG. 5 is a flow chart illustrating the operation of an inter-integrated circuit (I2C) master interface.

FIG. 5 is a flow chart 500 illustrating the operation of the error correction unit 120 in the master mode. The error correction unit 120 reads data from the external memory unit 230 for the on-chip registers 360 through the I2C interface, step 520. After reading the data, the error correction unit 120 writes the data into the on-chip registers 360, step 530. The error correction unit 120 checks whether all the data has been read, step 540. If the error correction unit 120 has not finished reading the data, steps 520 and 530 are repeated. If the error correction unit 120 has finished reading the data, the error correction unit 120 enters the I2C slave mode, step 550.

Figure 6A:
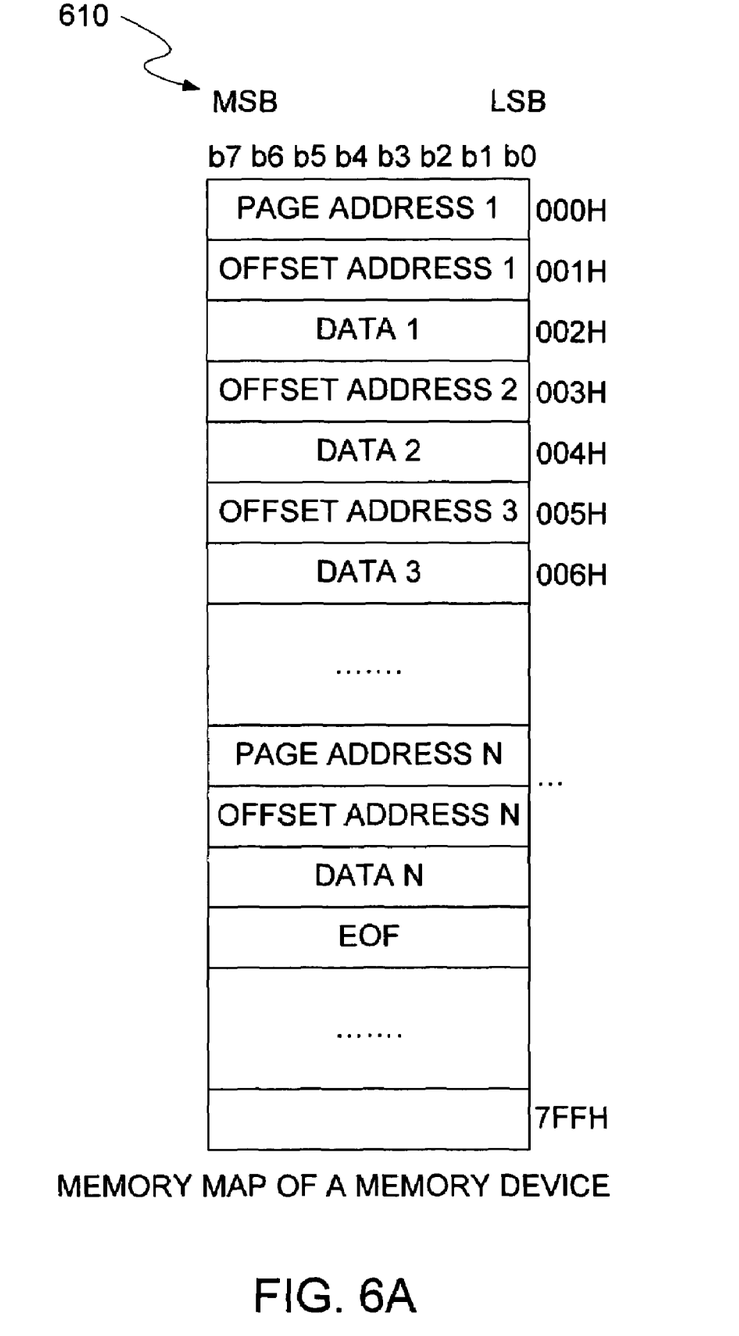
FIGS. 6A-6D depict the data structures stored in a memory device.

FIG. 6A depicts a memory map 610 of a memory device that illustrates how address and data of on-chip registers are stored in the memory device. The address and data are stored in sequential memory locations. The address is classified in two possible categories: page address and offset address. The address of on-chip registers has a first format that includes a page address and an offset address, and a second format that only includes an offset address. The page address, offset address, and data of one on-chip register form an information set. The information sets of on-chip registers are stored sequentially in the memory. However, if the page address of one information set is the same as the page address of a previous information set, the page address can be omitted from the information set. After storing the information sets of those on-chip registers that need to be automatically configured, an end-of-file (EOF) flag will be stored at the end. When retrieving the information sets from the memory device, if one information set has a missing page address, the page address from the previous information set is used to calculate the on-chip register address for the data. The retrieving operation continues until an end-of-file (EOF) is read. In the memory map 610 shown in FIG. 6A, the first information set, memory locations 000H-002H, includes one page address, one offset address, and one data. The second information set, memory locations 003H-004H, includes one offset address and one data. The storage location of the data of the second information set is calculated using the page address of the first information set and the offset address of the second information set. This principle and mechanism of omitting a repeated page address is also used during the storage of information in the memory device. This mechanism increases efficiency during reading and/or writing operations.

Figure 6B:
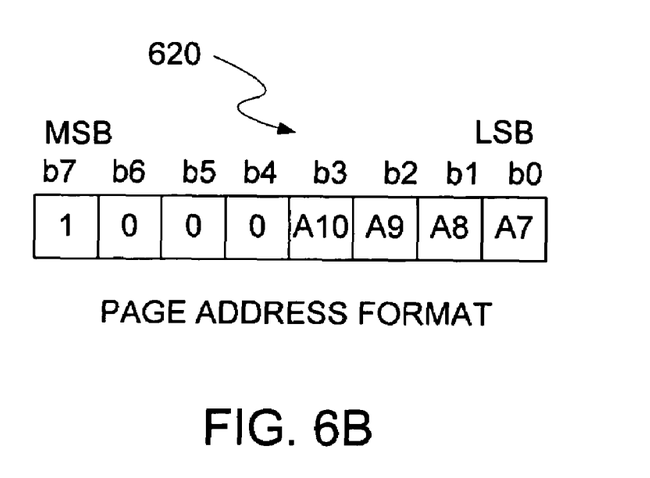
Figure 6C:
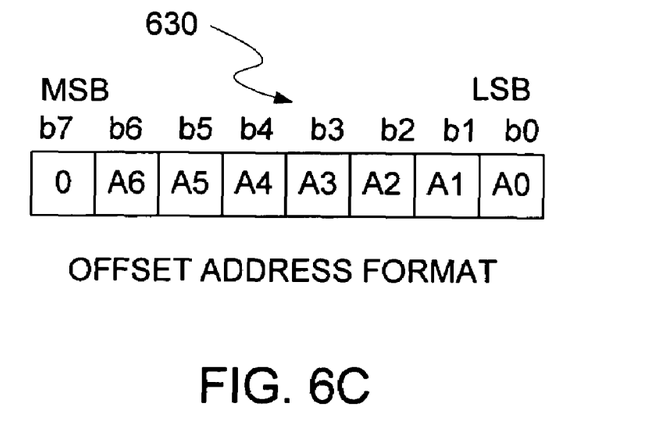
Figure 6D:
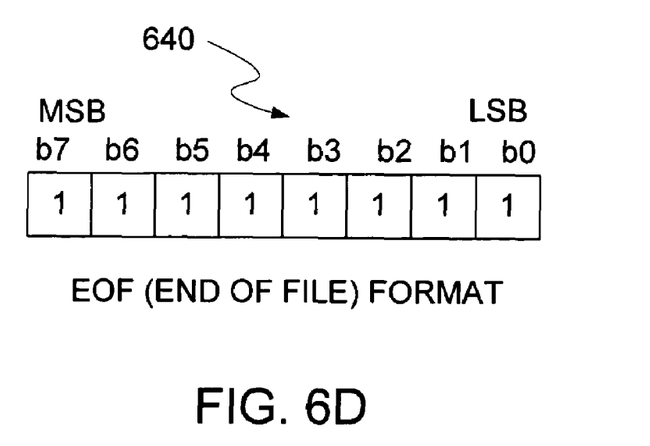

FIG. 6B illustrates a format 620 for a page address format. The page address is defined by one byte with upper four bits set to [1000]. FIG. 6C illustrates a format 630 for an offset address format. The offset address is defined by one byte with the most significant bit (MSB) set to 0. FIG. 6D illustrates a format 640 for an EOF. The EOF is defined by one byte where all bits are set to 1.

The on-chip registers 360 forms an addressable memory space of 16 pages and each page has 128 bytes. Each of 16 pages can be selected by a page address and each byte within the page can be addressed by the offset address. The address is defined by one 11-bit address denoted as A[10:0]. A[10:7] plus a fixed binary '1000' acts as the page address of one register. Therefore, the page address shown in format 620 has the following composition: bit [7:4] is fixed to a 4-binary data '1000'; bit [3:0] is A[10:7] of the register address A[10:0]. Each page of the on-chip register has 128 bytes, and it is addressed by A[6:0]. A[6:0] plus '0' forms the offset address of the register. As such, the offset address in format 630 has the following composition: bit 7 is set to one-binary data '0'; bits [6:0] is A[6:0] of the register address A[10:0]. If a byte is provided and the most significant bit of the byte is '1', the byte is the page address of the register as shown in format 620. Otherwise, if the most significant bit of the byte is '0', the byte is then the offset address of the register as shown in format 630. If the byte is '11111111', it is the instruction 'EOF' shown in format 640. The instruction 'EOF' marks the end of address or data in the memory device.

In the memory map 610, the memory device is provided with a first page address (page address 1), a first offset address (offset address 1) and first data (data 1) for a first on-chip register (register 1). The first page address, the first offset address and the first data can be stored in the memory device in three sequential entries. After the first page address, the first offset address, and the first data being stored, a second page address (page address 2), a second offset address (offset address 2), and second data (data 2) of a second on-chip register are provided to the memory device. Before the second page address, the second offset address, and the second data being stored, it will firstly be determined whether the second page address is the same as the first page address. If the second page address is equal to the first page address, the second page address will be discarded, and only the second offset address and the second data will be stored into two sequential entries in the memory device following the first data. Otherwise, if the second page address is different from the first page address, the second page address, the second offset address, and the second data will be stored into three sequential entries in the memory device. As such, the address and the configuration data of the register are stored in the memory device in a structure of a valid address-data pair (e.g. {page address, offset address, data} or {offset address, data} stored in sequence). The addresses and the data of a third, fourth, - - -, or Nth on-chip register will continue to be stored in the memory device in the similar way as of the second on-chip register, until a marker EOF is sent to the memory device. The marker EOF usually indicates the end of the valid address-data pair. The approach can greatly reduce the space of the memory device effectively. After the addresses and the data are stored in the memory device, they can be read by the error correction unit 120 and written into the on-chip registers 360. The first data will be written into the first on-chip register determined by the first page address and the first offset address. The second data will be written into the second on-chip register determined by the second page address and the second offset address. And the third, fourth, - - -, or Nth data will be stored into the third, fourth, - - -, or Nth on-chip register respectively.

Figure 7:
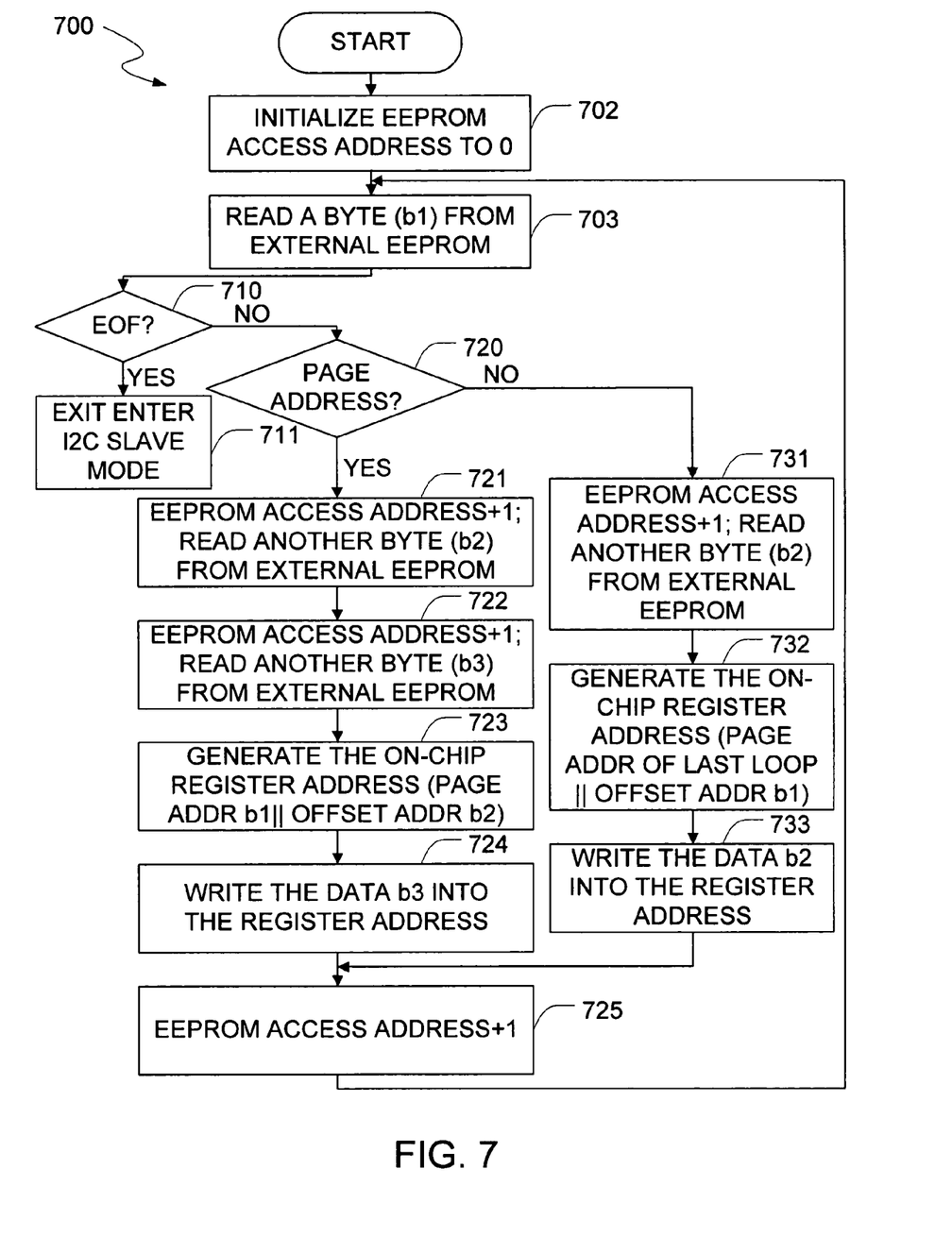
FIG. 7 is a flow chart of operation in an I2C master mode.

FIG. 7 is a flow chart 700 of operation in an I2C master mode. When the error correction unit 120 is powered on, the unit 120 starts to read data from an external source (such as the memory unit 230). The error correction unit 120 initiates an access address of the external source to 000h, step 702, and reads a first byte (b1) from this address, step 703.

If the first byte (b1) is not an EOF, step 710, the error correction unit 120 determines whether the first byte (b1) from the external source is a page address, step 720. If the first byte (b1) indicates it is a page address (e.g. b1[7] is '1'), step 720, the access address of the external source is incremented by one and the error correction unit 120 reads a second byte (b2) from the external source according to the new access address, step 721. The second byte (b2) herein is an offset address. After finishing reading the second byte (b2), the access address of the external source is again incremented by one, and the error correction unit 120 reads a third byte (b3) from the external source, step 722. The third byte (b3) herein is configuration data. The page address and the offset address are used to generate the target address of an on-chip register in the error correction unit 120, step 723. In step 724, the configuration data b3 (also known as target data) (the third byte) will be written into the on-chip register specified by the address generated in step 723. After storing the first configuration data (the third byte (b3)), the access address is incremented by one, step 725, and the memory device reading cycle is repeated.

If the first byte (b1) is not an EOF or a page address, it will be an offset address, step 730. If the first byte (b1) is an offset address (e.g. b1[7] is '0'), the error correction unit 120 reads a second byte (b2) from the external source, step 731. The second byte (b2) is configuration data that will be written into an on-chip register later. The target address of the on-chip register is derived by using the last page address reading from the external source and the offset address just reading from it, step 732. The last data read is written into the on-chip register specified by the address calculated in step 732, step 733. After the data is written into the on-chip register, the memory access cycle is repeated.

When a byte reading from the memory device is an EOF, step 710, then the error correction unit 120 will end the memory access cycle and enter into the I2C slave mode, step 711.

Figure 8:
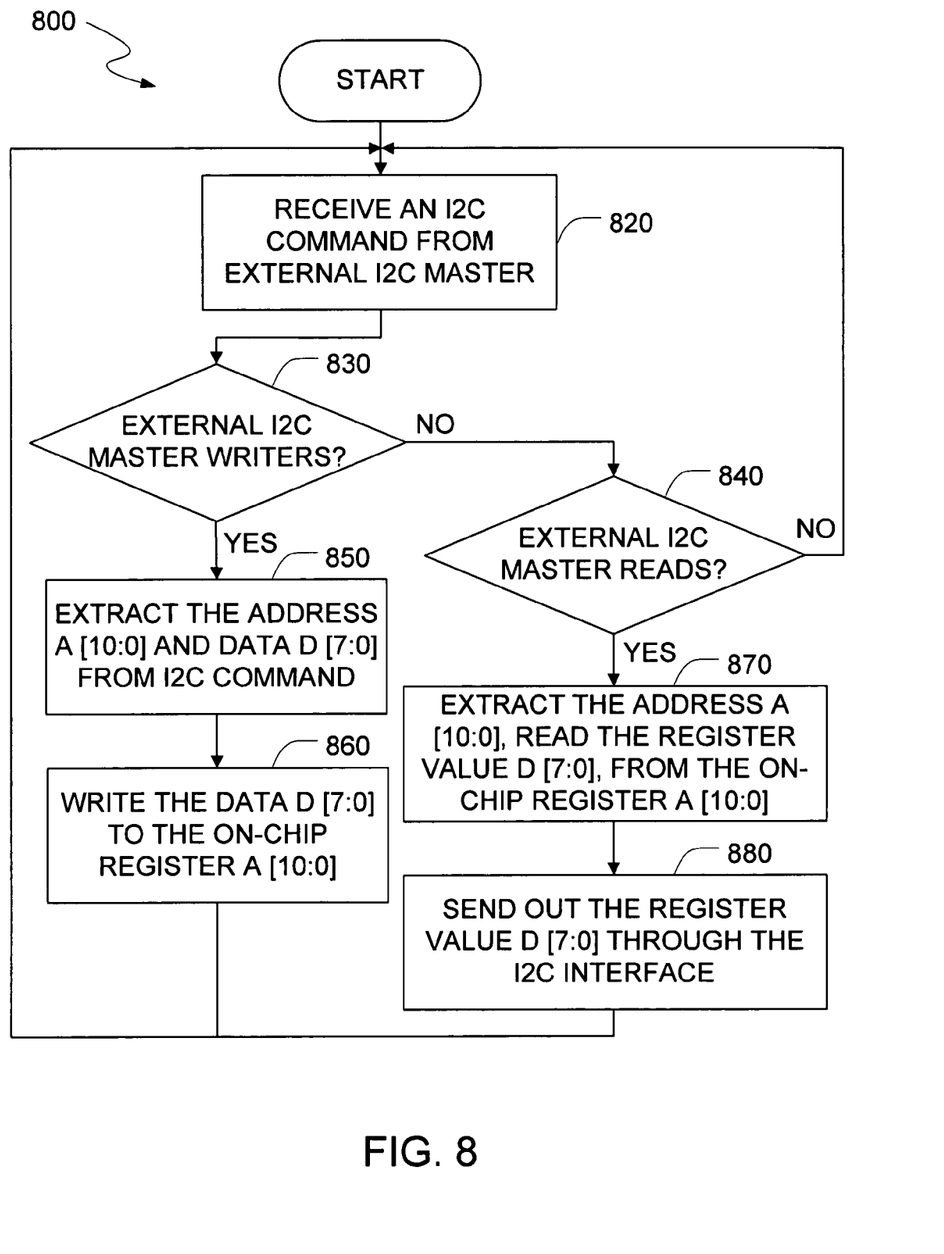
FIG. 8 is a flow chart of operation in an I2C slave mode.

FIG. 8 illustrates a flow chart 800 of operation in an I2C slave mode. The error correction unit 120 receives a command from an external master (not shown) through a serial interface, step 820, for example a MCU. After the command is received, it should be determined whether the external master wants to write data into the on-chip registers 360 in the error correction unit 120, step 830.

If the external master wants to write data into the on-chip registers 360, the error correction unit 120 extracts an address A[10:0] and data D[7:0] from the I2C command, step 850. Then the error correction unit 120 writes the data D[7:0] to an on-chip register, step 860. The address of the on-chip register is A[10:0]. After writing the data D[7:0] into the on-chip register specified by address A[10:0], the error correction unit 120 can go back to step 820, and receive another command.

If the external master wants to read data from the error correction unit 120, step 840, the unit 120 extracts the address A[10:0] and reads data D[7:0] from an on-chip register specified by address A[10:0], step 870. The error correction unit 120 will send out the data D[7:0] through the I2C interface, step 880. After sending out the data, the error correction unit 120 will receives another I2C command, step 820, and the cycle is repeated. If the command received is not a write or read command, the error correction unit 120 will go back to step 820 and receive a new command from the external I2C master.

In operation, the transponder 110 receives, converts, and transmits optical and electrical signals. During the power up procedure, the error correction unit 120 inside the transponder 110 goes through an auto-configuration process, wherein the error correction unit 120 is configured according to data stored in its internal on-chip registers 360. The data can be transferred into the on-chip registers 360 either under the master mode or the slave mode. The data are transferred into the error correction unit 120 through an I2C protocol. The I2C protocol is a serial interface and minimizes the number of pins used in the transfer.

When the error correction unit 120 is powered up, it checks whether it is operating in the master mode or slave mode. When signals IICSEL 301 and MICENA 302 are both active, the error correction unit enters the I2C master mode. The error correction unit 120 reads the external memory unit 230 where the configuration data has previously been stored. The information in the external memory unit 230 is read sequentially. The information includes page address, offset address, and configuration data. The error correction unit 120 determines which of the on-chip registers 360 each configuration data is stored in based on the page address and offset address.

In the context of FIGS. 4-5 and 7-8, the method may be implemented, for example, by operating portion of a computer circuit or executing a sequence of machine-readable instructions or a combination thereof. The instructions can reside in various types of signal-bearing or data storage primary, secondary, or tertiary media. The media may comprise, for example, RAM (not shown) accessible by, or residing within, the components of the wireless network. Whether contained in RAM, a diskette, or other secondary storage media, the instructions may be stored on a variety of machine-readable data storage media, such as DASD storage (e.g., a conventional "hard drive" or a RAID array), magnetic tape, electronic read-only memory (e.g., ROM, EPROM, or EEPROM), flash memory cards, an optical storage device (e.g. CD-ROM, WORM, DVD, digital optical tape), paper "punch" cards, or other suitable data storage media including digital and analog transmission media.

The embodiments that have been described herein, however, are but some of the several which utilize this invention and are set forth here by way of illustration but not of limitation. It is obvious that many other embodiments, which will be readily apparent to those skilled in the art, may be made without departing materially from the spirit and scope of the invention as defined in the appended claims. Furthermore, although elements of the invention may be described or claimed in the singular, the plural is contemplated unless limitation to the singular is explicitly stated.

What is claimed is:

1. An auto-configurable telecommunication device with error correction capabilities for handling optical signals and electronic signals, the device comprising:
   an optical-to-electronic transition unit for converting incoming optical signals received from a first external source into incoming electronic signals;
   an electronic-to-optical transition unit for converting outgoing electronic signals received from an auto-configurable error correction unit into outgoing optical signals; and
   the auto-configurable error correction unit capable of correcting errors in the incoming electronic signals and outgoing electronic signals according to a predefined algorithm retrieved from a storage unit, wherein the error correction unit further comprises:
   a master controller coupled to a serial interface unit, the master controller being capable of retrieving configuration data from an external memory device, the configuration data being used to configure the error correction unit;
   at least one register for storing the configuration data;
   a slave controller capable of, under control of the external controller, transmitting the configuration data from an external memory device to at least one register and retrieving the configuration data from the at least one register;
   a universal processor interface (UPI) unit for providing an interface to the external controller, the UPI unit being capable of transmitting the configuration data from the external controller to the at least one register and retrieving the configuration data from the at least one register;
   at least one multiplexer for selecting the configuration data from one of the serial interface unit and the UPI unit,
   wherein the configuration data is used in the error correction unit when the error correction unit being powered on, the master controller shares data and clock connectors with the slave controller, and the UPI unit shares data and clock connectors with the master controller and the slave controller.

2. The auto-configurable telecommunication device of claim 1, wherein the serial interface unit further comprises a serial data connector.

3. The auto-configurable telecommunication device of claim 2, wherein the serial data connector is a bi-directional data connector.

4. The auto-configurable telecommunication device of claim 1, wherein the serial interface unit is an Inter-integrated circuit (I2C) interface.

5. The auto-configurable telecommunication device of claim 1, wherein the serial interface unit further comprises an I2C master interface unit and an I2C slave interface unit, and wherein the I2C master interface unit shares the data and clock connectors with the I2C slave interface unit.

6. The auto-configurable telecommunication device of claim 1, wherein the storage unit further comprising a plurality of on-chip registers.

7. An error correction device for processing a predefined function in a communication network, the error correction device being in communication with an external memory device and an external controller, comprising:
   a master controller capable of retrieving configuration data from the external memory device, the configuration data being used to configure the error correction device;
   at least one register for storing the configuration data;
   a slave controller capable of, under control of the external controller, transmitting the configuration data from the external memory device to at least one register and retrieving the configuration data from the at least one register; and
   a universal processor interface (UPI) unit for providing an interface to the external controller, the UPI unit being capable of transmitting the configuration data from the external controller to the at least one register and retrieving the configuration data from the at least one register;
   at least one multiplexer for selecting the configuration data from one of a serial interface unit and the UPI unit,
   wherein the configuration data is used in the error correction device when the error correction device being powered on, the master controller shares data and clock connectors with the slave controller, and the UPI unit shares data and clock connectors with the master controller and the slave controller.

8. The error correction device of claim 7, further comprising:
   a master serial interface for receiving the configuration data from the external memory device; and
   a slave serial interface for transferring the configuration data between the external controller and the at least one register, wherein the slave serial interface being capable of bi-directional data transfer.

9. The error correction device of claim 8, wherein the master serial interface further comprises a master serial data connector and the slave serial interface further comprises a slave serial data connector.

10. The error correction device of claim 9, wherein the master serial data connector is a bi-directional connector and the slave serial data connector is a bi-directional connector.

11. The error correction device of claim 8, wherein the master serial interface is an Inter-integrated circuit (I2C) interface and the slave serial interface is an I2C interface.

12. The error correction device of claim 8, further comprising:
   a circuit including a first data path, a second data path an a third data path, wherein the first data path connects the at least one register with the master serial interface, the second data path connects the at least one register with the slave serial interface, and the third data path connects the at least one register with the UPI interface unit.

13. The error correction device of claim 7, wherein the external memory device is an EEPROM.

14. A method for auto-configuring an error correction device capable of operating in a master mode and a slave mode, comprising:
   receiving at the error correction device a plurality of signals from an external circuit;
   determining an operating mode for the error correction device based on the plurality of signals;
   retrieving configuration data from an external source through a serial interface if the operating mode is the master mode;
   receiving at the error correction device the configuration data from an external processor through the serial interface if the operating mode is the slave mode; and
   storing the configuration data into on-chip registers in the error correction device, wherein the configuration data will be used to auto-configure the error correction device,
   wherein data and clock connectors of the serial interface are shared in the master mode and in the slave mode and therein the data and clock connectors of the serial interface are shared with a UPI interface to satisfy a predetermined limit.

15. The method of claim 14, further comprising receiving the configuration data from the external processor through the UPI interface if the operating mode is a UPI mode.

16. The method of claim 14, wherein upon powering up, the error correction device enters the master mode.

17. The method of claim 14, wherein the master mode may be entered at any time through setting the plurality of signals.

18. The method of claim 14, wherein the slave mode may be entered at any time through setting the plurality of signals.

19. The method of claim 14, further comprising entering the slave mode after the master mode.

20. The method of claim 14, wherein the serial interface is an inter-integrated circuit (I2C) interface.

21. The method of claim 14, wherein the external source is an EEPROM.

22. A method for retrieving a target datum from a first memory device and determining a target address for the storage of the target datum into a second memory device, comprising:
   retrieving the target datum from the first memory device;
   retrieving a current address set for the target datum from the first memory device;
   determining a format for the current address set;
   if the current address set has a first format, which includes a page address and an offset address, computing the target address for the target datum by adding the page address to the offset address of the current address set; and
   if the current address set has a second format, which includes an offset address, computing the target address for the target datum by adding the page address from a previous address set to the offset address from the current address set, the previous address set being an address set from a previous retrieval of a current address set.

23. The method as claimed of 22, further comprising:
   storing the datum into the second memory device determined by the target address.

* * * * *